US008066244B2

(12) United States Patent
Hsieh

(10) Patent No.: US 8,066,244 B2

(45) Date of Patent: Nov. 29, 2011

(54) LIFTING PLATFORM WITH MICROADJUSTMENT MECHANISMS

(75) Inventor: Ming-Hung Hsieh, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 417 days.

(21) Appl. No.: 12/388,824

(22) Filed: Feb. 19, 2009

(65) Prior Publication Data

US 2010/0206201 A1 Aug. 19, 2010

(51) Int. Cl.
*A47B 91/00* (2006.01)

(52) U.S. Cl. ................ 248/346.01; 248/188.1; 248/678; 108/144.11

(58) Field of Classification Search ............. 248/346.01, 248/188.1, 188.2, 188.3, 188.4, 678; 280/763.1; 108/51.11, 54.1, 144.11; 182/2.1, 2.2, 141, 182/144

See application file for complete search history.

(56) References Cited

U.S. PATENT DOCUMENTS 3,052,918 A * 9/1962 Holmes ......................... 425/149
5,535,655 A * 7/1996 Kammann ...................... 83/559
2006/0248814 A1* 11/2006 Chen et al. .................. 52/126.6

* cited by examiner

*Primary Examiner* — Anita M King

(57) ABSTRACT

A lifting platform with microadjustment mechanisms comprises plural microadjustment mechanisms. The microadjustment mechanisms can cooperate with adjustment pieces to adjust the level degree of the lifting platform, and the relative distance between each two microadjustment mechanisms can be adjusted by moving the support portions of the respective microadjustment mechanisms within the displacement clearance defined between the holding grooves of the lifting platform and the adjustment discs. By such arrangements, the microadjustment time can be relatively reduced.

3 Claims, 4 Drawing Sheets

10
11
12
30
31
21
20
22
30
20

LIFTING PLATFORM WITH MICROADJUSTMENT MECHANISMS

BACKGROUND OF THE INVENTION

1. Field of the Invention

The present invention relates to a lifting platform for carrying load; and more particularly to a lifting platform with microadjustment mechanisms.

2. Description of the Prior Art

The existing common lifting platforms each normally have one side for carrying workpieces, and the other side provided with plural guide rods. Once these guide rods are installed, if it is found that the lifting platform is not level or the relative distance between these guide rods is incorrect, conventionally, the guide rods will be dismantled and then rearranged to adjust the height difference of the guide rods, or the installation holes for installing the guide rods will be reprocessed to adjust the relative distance between the guide rods. However, if the lifting platform is too large, dismantling and rearranging all its elements will be very time consuming and tedious.

The present invention has arisen to mitigate and/or obviate the afore-described disadvantages.

SUMMARY OF THE INVENTION

The primary objective of the present invention is to provide a lifting platform with microadjustment mechanisms, which can micro-adjust the error of the lifting platform.

In order to achieve the above objective, a lifting platform with microadjustment mechanisms in accordance with the present invention comprises plural holding grooves disposed in one side of the lifting platform; and plural microadjustment mechanisms each being axially provided with a support portion. The support portions of the microadjustment mechanisms are disposed in the respective holding grooves by an adjustment disc, and between an end surface of the adjustment disc and a bottom surface of the holding groove being disposed an adjustment disc. A displacement clearance is defined between a side surface of the respective adjustment discs and a side surface of the respective holding grooves.

Further analysis shows that the lifting platform with microadjustment mechanisms in accordance with the present invention has the following advantages: the adjustment pieces are used to adjust the height difference, and the holding grooves of the lifting platform cooperate with the adjustment discs to utilize the displacement clearance to adjust the horizontal distance, so that the microadjustment speed can be increased.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
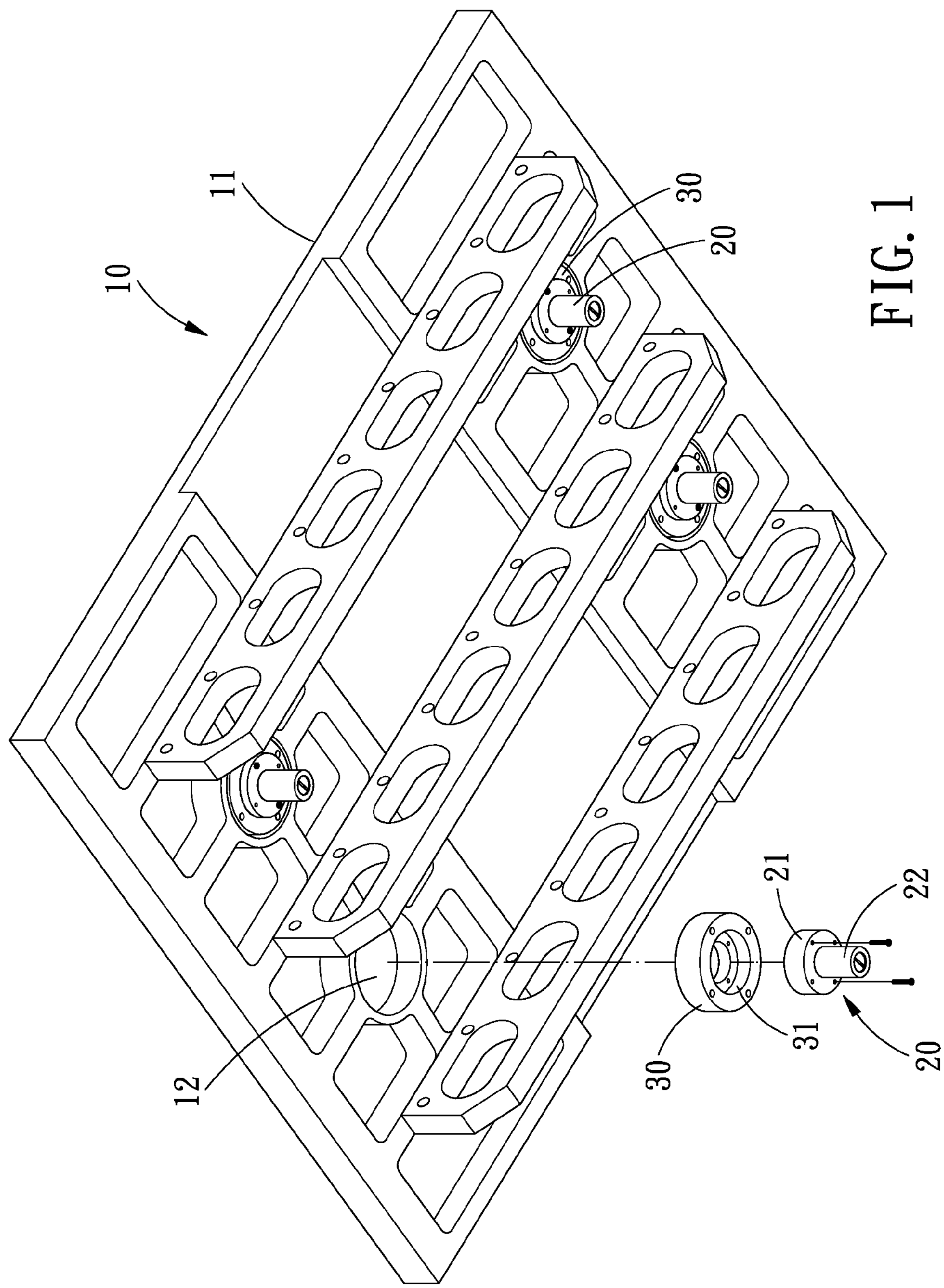
FIG. 1 is a perspective view of a lifting platform with microadjustment mechanisms in accordance with the present invention.
Figure 2:
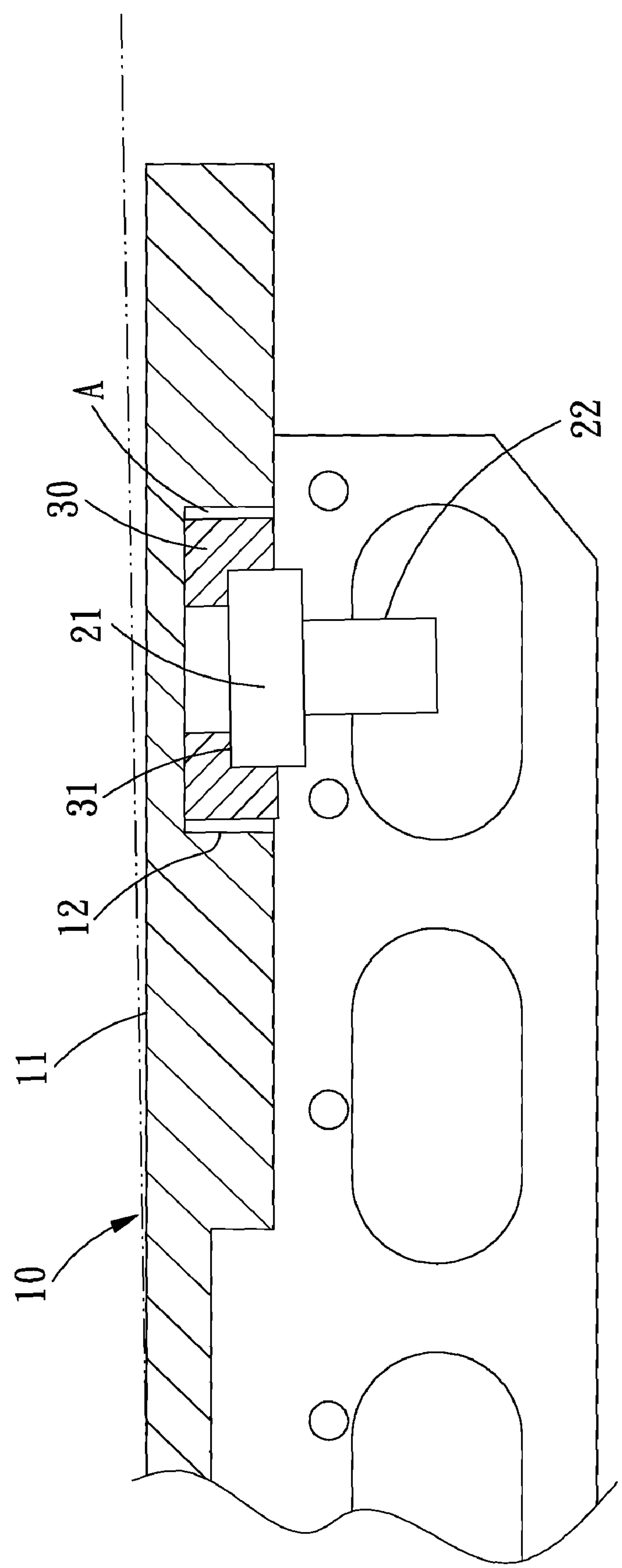
FIG. 2 is an assembly view of the lifting platform with microadjustment mechanisms in accordance with the present invention.

Referring to FIGS. 1-2, a lifting platform 10 in accordance with the present invention is provided with a carrying surface 11 on a top side thereof, and plural holding grooves 12 in a bottom side thereof. The holding grooves 12 are employed to cooperate with plural microadjustment mechanisms 20.

Each of the microadjustment mechanisms 20 is axially formed with a support portion 21 and a guide portion 22. The support portion 21 is larger than the guide portion 22 in cross section.

The support portion 21 of each of the microadjustment mechanisms 20 further cooperates with an adjustment disc 30. Each of the adjustment discs 30 is axially formed in one end thereof with a holding groove 31 for accommodation of the support portion 21 of each of the microadjustment mechanisms 20. The support portion 21 of each of the microadjustment mechanisms 20 is smaller than the holding groove 31 of each of the adjustment discs 30 in cross section. The support portion 21 must be sized to fit into the holding groove 31.

The adjustment discs 30 are smaller than the respective holding grooves 12 of the lifting platform 10 in cross section, and the adjustment discs 30 must be sized to fit into the respective holding grooves 12. The support portions 21 of the microadjustment mechanisms 20 are disposed in the respective holding grooves 12 through the adjustment discs 30 in such a manner that an external end surface of each of the adjustment discs 30 abuts against an inner bottom surface of each of the holding grooves 12, and there is a displacement clearance A defined between the external side surface of the respective adjustment discs 30 and the inner side surface of the respective holding grooves 12. The support portions 21 of the microadjustment mechanisms 20, the holding grooves 31 of the adjustment discs 30 and the holding grooves 12 of the lifting platform 10 are preferably round in shape. The adjustment discs 30 are assembled to the lifting platform 10 by screws, and the microadjustment mechanisms 20 are assembled to the adjustment discs 30 by screws.

Figure 3:
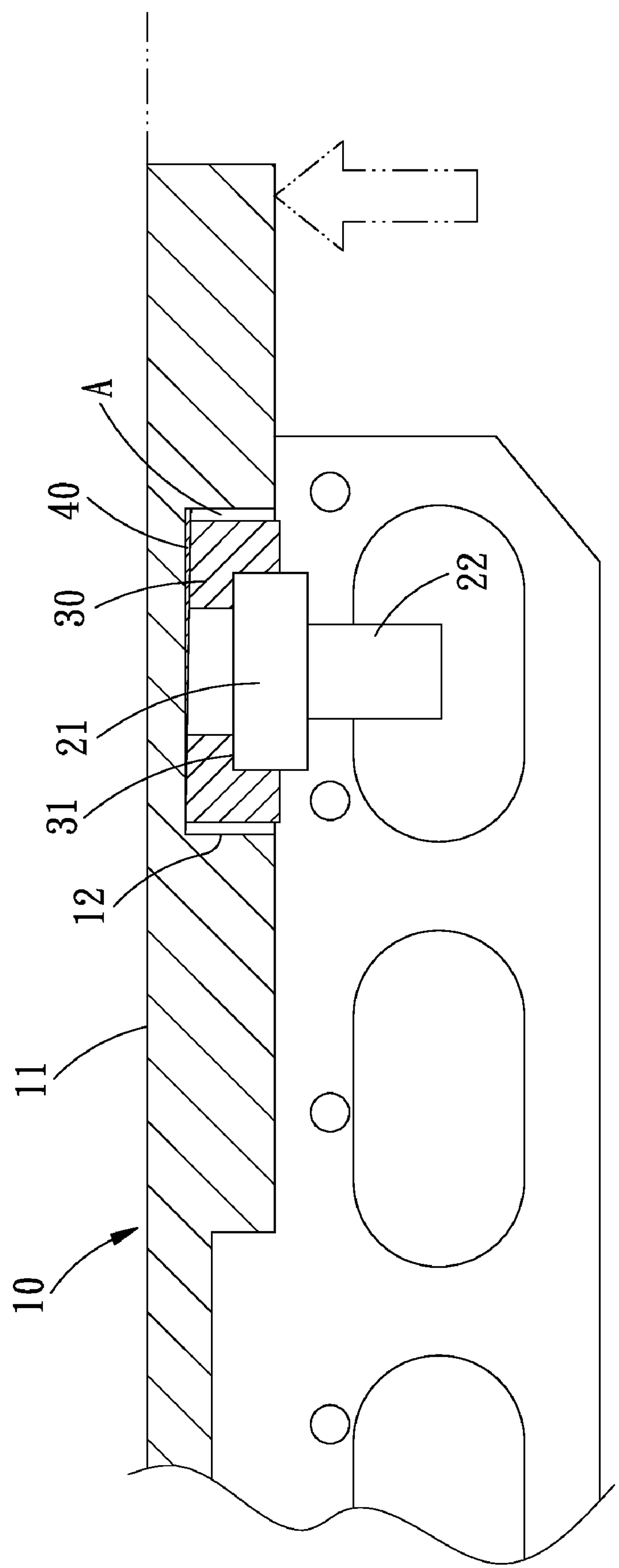
FIG. 3 is a first schematic view showing the adjustment of the lifting platform with microadjustment mechanisms in accordance with the present invention.
Figure 4:
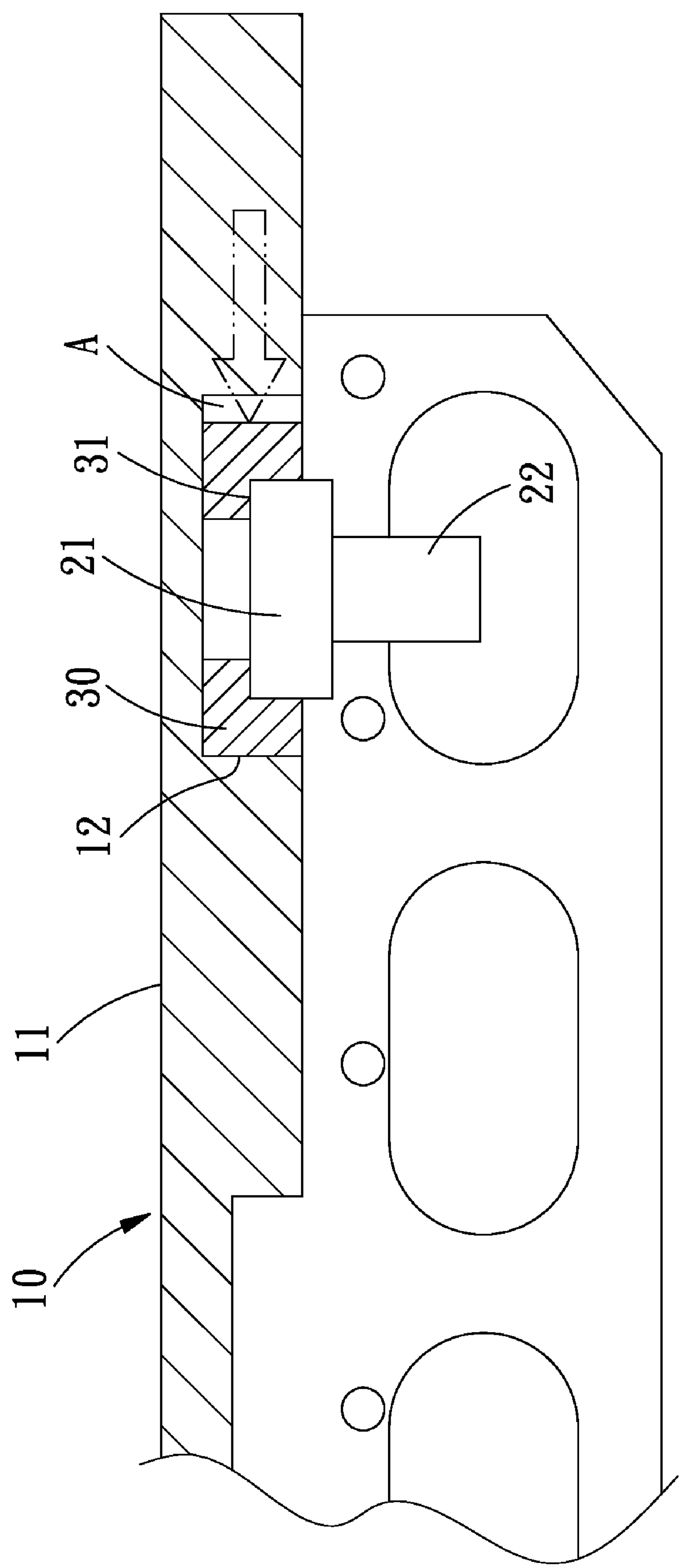
FIG. 4 is a second schematic view showing the adjustment of the lifting platform with microadjustment mechanisms in accordance with the present invention.

As shown in FIGS. 2-4, if the carrying surface 11 of the lifting platform 10 is not level, an adjustment piece 40 having a desired thickness can be disposed between the end surface of the adjustment disc 30 and the bottom surface of the holding groove 12 of the lifting platform 10 to adjust the level degree of the carrying surface 11 of the lifting platform 10, and the user only needs to dispose the adjustment pieces 40 between the adjustment discs 30 and the holding grooves 12 of the lifting platform 10 where the height difference occurs.

If a distance between each two microadjustment mechanisms 20 needs adjusting, the support portions 21 of the two microadjustment mechanisms 20 can be horizontally moved within the displacement clearances A between the adjustment discs 30 and the respective holding groove 12 of the lifting platform 10 to realize the adjustment. Since the adjustment discs 30 and the holding grooves 12 of the lifting platform 10 are round in shape, the support portions 21 of the microadjustment mechanisms 20 can be horizontally moved in multi-directions within the holding grooves 12 of the lifting platform 10 by the adjustment discs 30.

While we have shown and described various embodiments in accordance with the present invention, it is clear to those skilled in the art that further embodiments may be made without departing from the scope of the present invention.

What is claimed is:

1. A lifting platform with microadjustment mechanisms comprising: plural holding grooves disposed in one side of the lifting platform; and plural microadjustment mechanisms each being axially provided with a support portion, the support portions of the micro adjustment mechanisms being disposed in the respective holding grooves by an adjustment disc, an adjustment piece being disposed between an end surface of the adjustment disc and a bottom surface of the holding groove, a displacement clearance being defined between a side surface of the respective adjustment discs and a side surface of the respective holding grooves, wherein the respective adjustment discs are provided with a holding groove for accommodation of the support portion of the respective microadjustment mechanisms.

2. A lifting platform with microadjustment mechanisms comprising: plural holding grooves disposed in one side of the lifting platform; and plural microadjustment mechanisms each being axially provided with a support portion, the support portions of the microadjustment mechanisms being disposed in the respective holding grooves by an adjustment disc, an adjustment piece being disposed between an end surface of the adjustment disc and a bottom surface of the holding groove, wherein the respective adjustment discs are provided with a holding groove for accommodation of the support portion of the respective microadjustment mechanisms.

3. A lifting platform with micro adjustment mechanisms comprising: plural holding grooves disposed in one side of the lifting platform; and plural micro adjustment mechanisms each being axially provided with a support portion, the support portions of the micro adjustment mechanisms being disposed in the respective holding grooves by an adjustment disc, a displacement clearance being defined between a side surface of the respective adjustment discs and a side surface of the respective holding grooves, wherein the respective adjustment discs are provided with a holding groove for accommodation of the support portion of the respective microadjustment mechanisms.

* * * * *